United States Patent
Proctor et al.

(10) Patent No.: US 9,361,582 B2
(45) Date of Patent: Jun. 7, 2016

(54) EFFICIENT BINARY PROTOCOL MARSHALLING FOR RULE ENGINE SESSIONS

(75) Inventors: Mark Proctor, London (GB); Edson Tirelli, Montreal (CA)

(73) Assignee: Red Hat, Inc., Raleigh, NC (US)

(*) Notice: Subject to any disclaimer, the term of this patent is extended or adjusted under 35 U.S.C. 154(b) by 822 days.

(21) Appl. No.: 13/602,724

(22) Filed: Sep. 4, 2012

(65) Prior Publication Data

US 2012/0330877 A1 Dec. 27, 2012

Related U.S. Application Data

(63) Continuation of application No. 12/547,870, filed on Aug. 26, 2009, now Pat. No. 8,271,419.

(51) Int. Cl.
*G06N 5/02* (2006.01)
*G06F 9/54* (2006.01)

(52) U.S. Cl.
CPC ............... *G06N 5/025* (2013.01); *G06F 9/547* (2013.01); *G06N 5/02* (2013.01)

(58) Field of Classification Search
None
See application file for complete search history.

(56) References Cited

U.S. PATENT DOCUMENTS

2011/0055137 A1 3/2011 Proctor et al.

OTHER PUBLICATIONS

Engelmann, et al., RMIX: A Dynamic, Heterogeneous, Reconfigurable Communication Framework, International Conference on Computational Science (ICCS) 2006, May 2006, pp. 1-17.*
USPTO Notice of Allowance for U.S. Appl. No. 12/547,870 mailed May 15, 2012.
Leifer et al., "Marshalling: Abstraction, Rebinding, and Version Control," Draft Paper, Dec. 2, 2003, 58 pages.
Proctor, M., "Efficient Binary Protocol Marshalling for Drools Stateful Sessions," posted May 18, 2008, accessed at <http://blog.athico.coom/2008/05/efficient-binary-protocol-marshalling.html> on Aug. 26, 2009, 5 pages.
"Marshalling (computer science)", accessed at <http://en.wikipedia.org/wiki/Marshalling_%28computer_science%29> on Jun. 12, 2008, page last updated Jun. 9, 2008, 1 page.
Ryan et al., "Schema for Representing Java (tm) Objects in an LDAP Directory," Sun Microsystems, Inc., Oct. 1999, accessed at <http://tools.ietf.org/html/rfc2713> on Jun. 12, 2008, 21 pages.

* cited by examiner

*Primary Examiner* — Wilbert L Starks
(74) *Attorney, Agent, or Firm* — Lowenstein Sandler LLP

(57) ABSTRACT

Some embodiments of efficient binary protocol marshalling for rule engine sessions have been presented. In one embodiment, a set of marshalling plug-ins is provided to a rule engine. Each of the set of marshalling plug-ins is customized for a type of user objects. In response to encountering a user object, the rule engine selects a marshalling plug-in out of the set of marshalling plug-ins based on a type of the user object to marshall in or to marshall out the user object.

21 Claims, 7 Drawing Sheets

EFFICIENT BINARY PROTOCOL MARSHALLING FOR RULE ENGINE SESSIONS

RELATED APPLICATIONS

This application is a continuation of U.S. patent application Ser. No. 12/547,870, filed on Aug. 26, 2009, which is incorporated herein by reference.

TECHNICAL FIELD

Embodiments of the present invention relate to artificial intelligence, and more specifically to rule engines.

BACKGROUND

The development and application of rule engines and rules is one branch of Artificial Intelligence (A.I.), which is a very broad research area that focuses on "making computers think like people." A rule is a logical construct for describing the operations, definitions, conditions, and/or constraints that apply to some predetermined data to achieve a goal. Broadly speaking, a rule engine processes information by applying rules to data objects (also known as facts). These data objects may include user defined objects referred to as user objects. A data object has to be asserted into a working memory of the rule engine in order for the rule engine to evaluate the data object against some predetermined rules.

Conventionally, a data object is sent to a rule engine in a serialized form, such as in a binary stream. The rule engine deserializes the incoming binary stream to put the data object into a format usable by the rule engine. Likewise, to output data objects, the rule engine serializes the data objects to generate an outgoing binary stream. Regardless of the type of data objects, the conventional rule engine serializes the data objects in order to send them out and deserializes incoming binary stream in order to extract data objects from the binary stream.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
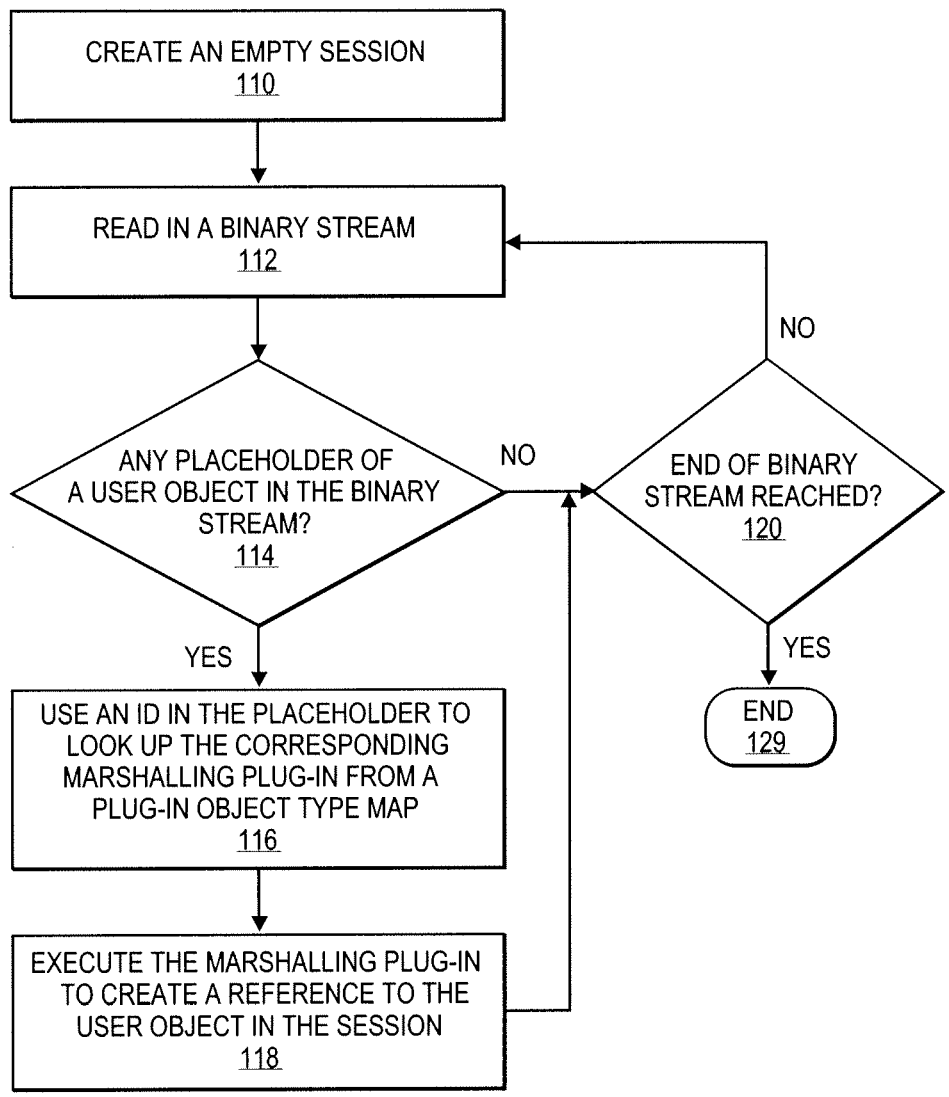
FIG. 1A illustrates one embodiment of a process to marshall in user objects to a rule engine.

Described herein are some embodiments of efficient binary protocol marshalling for rule engine sessions. Broadly speaking, marshalling refers to conversion of data from one format to another format for various purposes, such as for transmission, for evaluation against rules, for storage, etc. The data may include user objects. A user object as used herein broadly refers to a unit of data organized in a user-defined format. For example, a user object may be a tuple in a linked list in some embodiments. Furthermore, marshalling data into a rule engine refers to converting data external to the rule engine into a format usable by the rule engine. Likewise, marshalling data out of a rule engine refers to converting data internal to the rule engine into a format suitable for transmitting out of the rule engine.

In one embodiment, a set of marshalling plug-ins is provided to a rule engine. In general, a plug-in of a rule engine refers to a computer program that can be added onto the rule engine. Because user objects of different types have to be converted in different ways, different marshalling plug-ins are provided to the rule engine customized for user objects of different types. Moreover, there may be two marshalling plug-ins for each user object type, one for marshalling user objects of the specific type into the rule engine, and one for marshalling the user objects out of the rule engine. To marshall a particular user object, the rule engine may select one of the marshalling plug-ins available based on the user object type. In some embodiments, a default marshalling plug-in may be provided for user objects that have no customized marshalling plug-in. More details of some embodiments of the rule engine and the marshalling plug-ins are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a method to marshall in user objects to a rule engine. The process may be performed by a rule engine implemented with processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the process in some embodiments.

Initially, the rule engine core creates an empty session (block 110). A session (also referred to as a rule engine session or a working memory) as used herein broadly refers to a predetermined period of time in which data asserted into a rule engine is evaluated against rules added to the rule engine. Note that a session may be stateful or stateless. In a stateful session, data can be asserted and modified over time, and rules can also be added and removed. In contrast, in a stateless session, no more data can be asserted or modified and rules cannot be added or removed after the initial data set has been asserted. In other words, there is no rule re-evaluations in a stateless session.

Referring back to FIG. 1A, the rule engine reads in a binary stream of data (block 112). A user of the rule engine provides the binary stream of data to the rule engine, which may include a set of one or more placeholders for user objects. As mentioned above, a user object as used herein broadly refers to a unit of data organized in a user-defined format. Many different types of user objects may be defined to meet the needs of the user. For example, for a mortgage application, a user object named "Applicant" may be defined to be an object with a character element to hold a name of a mortgage applicant, an integer element to hold the age of the applicant, etc. While reading in the binary stream, the rule engine determines if there is any placeholder for a user object in the binary stream (block 114). If there is no placeholder in the binary stream, then the rule engine checks to determine if the end of the binary stream has been reached (block 120). If so, the process ends at block 129. Otherwise, the method transitions back to block 112 to repeat the above operations.

If there is a placeholder for a user object in the binary stream, the rule engine uses an identification in the placeholder to look up a corresponding marshalling plug-in from a plug-in object type map stored in the rule engine (block 116). In some embodiments, the rule engine maintains the plug-in object type map to associate user object types with their corresponding customized marshalling plug-ins. Then the rule engine executes the marshalling plug-in found to create a reference to the user object in the session (block 118). Afterwards, the rule engine checks to determine if the end of the binary stream has been reached (block 120). If so, the process ends at block 129. Otherwise, the method transitions back to block 112 to repeat the above operations.

The marshalling plug-ins implement various marshalling strategies. A user of the rule engine may code a marshalling plug-in to implement a specific marshalling strategy. Alternatively, the rule engine may come with marshalling plug-ins implementing some predefined marshalling strategies. In some embodiments, there are two marshalling strategies, namely, serialised marshalling strategy and identity marshalling strategy. Serialized marshalling strategy writes a user object to a binary stream via standard readObject method and writeObject method. To marshall out a user object, the identity marshalling strategy assigns an identification to the user object and places the identification in a map. Then the identification is written to a binary stream. In some embodiments, the identification includes an integer generated from an integer counter. When marshalling in the user object according to the identity marshalling strategy, the map is used to look up the user object. Therefore, the identity marshalling strategy is stateful. Furthermore, the writeObject method can be called only once according to the identity marshalling strategy, while the readObject method can be called repeatedly. In some embodiments, the rule engine uses marshalling plug-ins that implement the identity marshalling strategy as the default marshalling plug-ins.

With customized marshalling plug-ins, the rule engine may readily pause and then resume a session. This is particularly useful in moving a session from one server to another server, or restarting an existing server. In some embodiments, a snapshot of a session at a particular time can be taken using the customized marshalling plug-ins. For example, a session may be paused and data in the session is then marshalled out of the rule engine using marshalling plug-ins customized for user objects in the session. Furthermore, the rule engine may take snapshots at the end of each transaction in the session in order to provide transaction consistency and high availability.

In some embodiments, pre-loaded session templates are created using the customized marshalling plug-ins. Pre-loaded session templates saves time spent inserting data to the rule engine when stateful sessions with the same base set of data are created repeatedly. For instance, a user may populate a session once initially. To create a pre-loaded session template, the rule engine writes out the initial session to a binary stream using the appropriate marshalling plug-ins. Then the rule engine may use this binary stream as the pre-loaded session template to create one or more sessions having the same base set of data in the future.

Figure 1B:
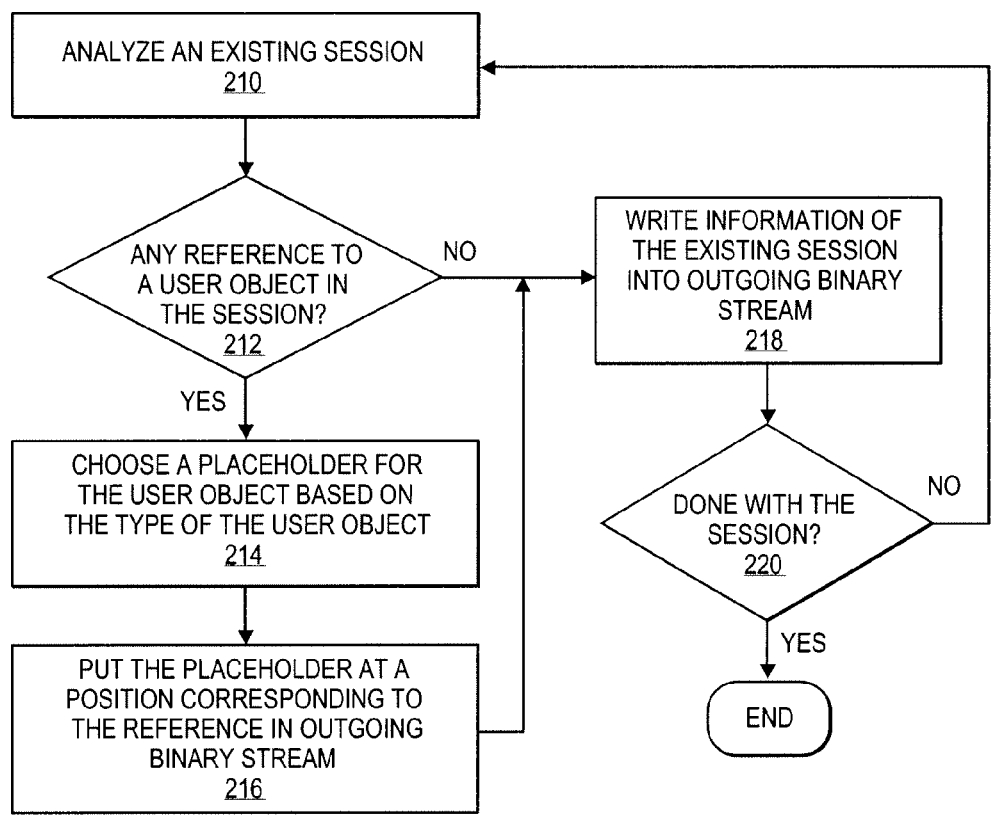
FIG. 1B illustrates one embodiment of a method to marshall out user objects from a rule engine.

FIG. 1B illustrates one embodiment of a method to marshall out user objects from a rule engine. The process may be performed by a rule engine implemented with processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the method in some embodiments.

Referring to FIG. 1B, the rule engine analyzes an existing session (block 210). To analyze the existing session, the rule engine looks at one element at a time in some embodiments. Then the rule engine checks to determine if there is any reference in the session to a user object (block 212). If there is a reference to a user object, then the rule engine chooses a placeholder for the user object based on the type of the user object (block 214). The rule engine then puts the placeholder at a position corresponding to the reference in an outgoing binary stream (block 216) and transitions to block 218.

If there is no reference to a user object, then the rule engine transitions to block 218 to write information of the existing session into the outgoing binary stream (block 218). The rule engine then checks to determine if it is done with the session (block 220). If not, the rule engine transitions back to block 210 to continue the process. Otherwise, the method ends at block 229.

In some embodiments, the rule engine with various marshalling plug-ins may be used to process mortgage applications. A lender may provide a set of predefined business rules (e.g., age>18, monthly income>2×monthly mortgage payment, loan amount<80% of subject property value, etc.), which are input to the rule engine. Information of an applicant and the subject property may be organized as a set of user objects of various types (e.g., person, assets, income, appraised value of the subject property, etc.). These user objects may be marshalled into or marshalled out of the rule engine as discussed in details above.

Figure 2A:
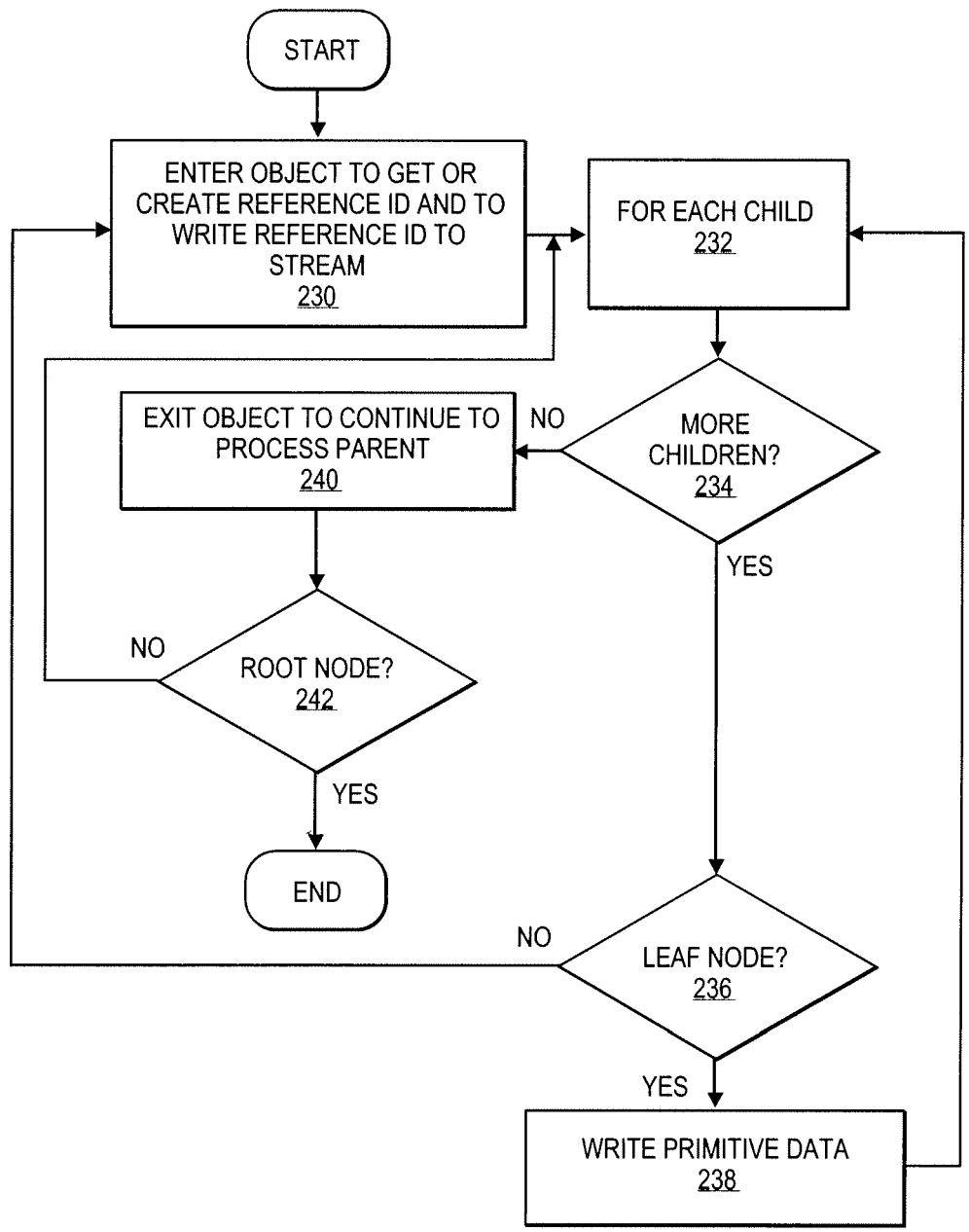
FIG. 2A illustrates one embodiment of a method to analyze session data.

FIG. 2A illustrates one embodiment of a method to analyze session data. The method may be performed by a rule engine implemented with processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the method in some embodiments.

The rule engine first enters an object at block 230. In some embodiments, the rule engine may get or create a reference identification (ID) for the object, depending on whether a reference ID of the object already exists, and writes the reference ID to a stream of binary data. Then the rule engine begins to process each child of the object at block 232. The rule engine first determines if the object has any more children at block 234. If there is at least a child, then the rule engine determines if the child is a leaf node at block 236. If the child is not a leaf node, then the rule engine returns to block 230. Otherwise, if the child is a leaf node, then the rule engine writes primitive data at block 238, and then returns to block 232.

In some embodiments, if the rule engine determines that the object has no more children at block 234, the rule engine exits the object at block 240 to continue to process a parent of the object. Then the rule engine determines if the parent is a root node at block 242. If not, the rule engine returns to block 232 to continue the method. Otherwise, if the parent is a root node, then the method ends. To further illustrate the above method, an example is described in details below with reference to the exemplary session data in FIG. 2B.

Figure 2B:
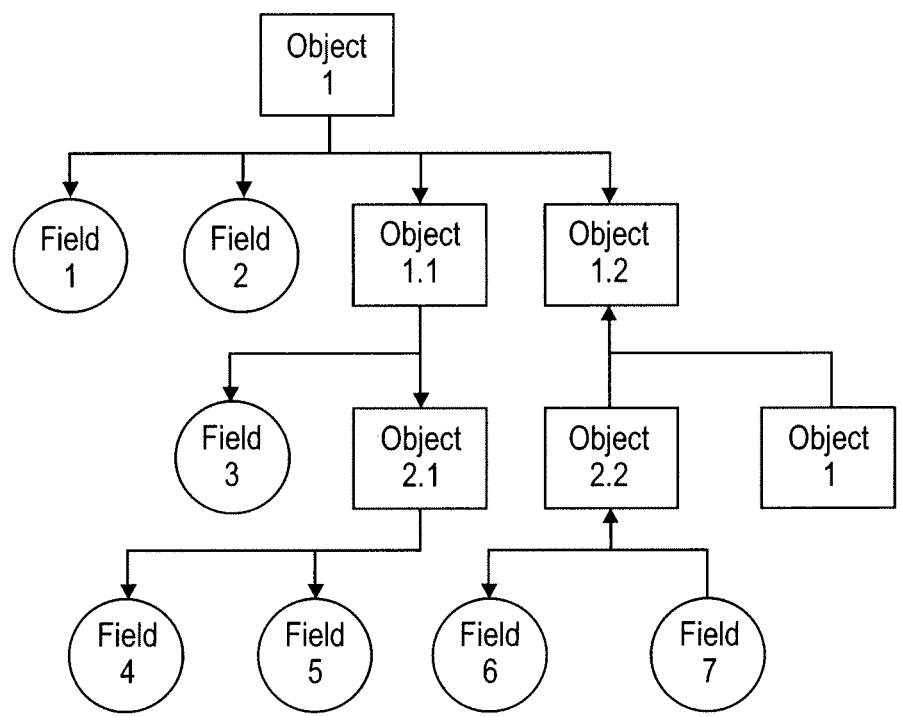
FIG. 2B illustrates some exemplary session data.

FIG. 2B illustrates some exemplary session data. To analyze the session data in FIG. 2B, one embodiment of the rule engine may first enter Object 1 to create a reference ID and write the reference ID to a stream of binary data. Then the rule engine may loop through each child of Object 1 as described below.

In some embodiments, the children of an object may include fields and/or other objects. Referring to FIG. 2B, Object 1 has the following children: Field 1, Field 2, Object 1.1, and Object 1.2. The rule engine may write primitive Field 1, and then primitive Field 2. Then the rule engine may enter Object 1.1 to create another reference ID and write the reference ID to the stream.

Object 1.1 has two children, namely, Field 3 and Object 2.1. The rule engine writes primitive Field 3, and then enters Object 2.1 to create another reference ID for Object 2.1 and write the reference ID to the stream. Object 2.1 also has two children, namely, Field 4 and Field 5, which are leaf nodes. Therefore, the rule engine writes primitive Field 4 and primitive Field 5. Then the rule engine exits Object 2.1. Because the rule engine has completed analysis of all children of Object 1.1 at this point, the rule engine exits Object 1.1.

In some embodiments, the rule engine then enters Object 1.2 (which is the last child of Object 1) to create a reference ID for Object 1.2 and write it to the stream. Next, the rule engine enters Object 2.2 to create a reference ID for Object 2.2 and write it to the stream. Object 2.2 has two children, namely, Field 6 and Field 7. The rule engine writes primitive Field 6 and primitive Field 7. Then the rule engine exits Object 2.2. Next, the rule engine enters Object 1 again because the second child of Object 1.2 is a circular reference to Object 1. The rule engine gets and writes the reference ID for Object 1 because the reference ID of Object 1 has already been created. As such, the rule engine has completely analyzed the exemplary session data in FIG. 2B.

Figure 3:
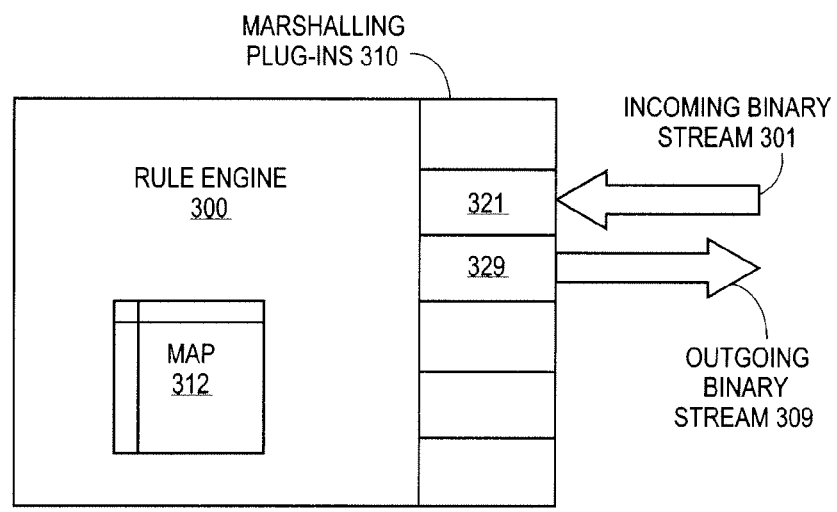
FIG. 3 shows one embodiment of a rule engine coupled to a set of marshalling plug-ins.

FIG. 3 shows one embodiment of a rule engine 300 coupled to a set of marshalling plug-ins 310. The set of marshalling plug-ins 310 includes marshalling plug-ins customized for some predefined user object types. The rule engine 300 may select a marshalling plug-in out of the set 310 to marshall in or marshall out a user object based on the type of the user object. The set of marshalling plug-ins may further include a default marshalling plug-in, which may be executed when there is no customized marshalling plug-in available for a particular user object. In some embodiments, users may add marshalling plug-ins to the set 310 as needed. Likewise, users may remove marshalling plug-ins from the set 310 as well. In other words, the marshalling plug-ins 310 are pluggable.

The rule engine 300 includes a storage device to store a plug-in object type map 312. The plug-in object type map 312 stores a list of user object types and the names of their corresponding marshalling plug-ins. When encountering a particular user object in an incoming binary stream 301, the rule engine 300 may determine the type of the particular user object and then look up the corresponding marshalling plug-in from the plug-in object type map 312. If there is no corresponding marshalling plug-in for this particular type of user object, the rule engine 300 may select a default marshalling plug-in. Then the rule engine 300 executes the marshalling plug-in 321 selected to marshall in the particular user object.

Likewise, when encountering a particular user object in an existing session, the rule engine 300 may determine the type of the particular user object and then look up the corresponding marshalling plug-in from the plug-in object type map 312. If there is no corresponding marshalling plug-in for this particular type of user object, the rule engine 300 may select a default marshalling plug-in. Then the rule engine 300 executes the marshalling plug-in 329 selected to marshall out the particular user object. In some embodiments, the marshallign plug-in 329 selects a placeholder for the user object based on the type of the user object and puts the placeholder into the outgoing binary stream 309 at a location corresponding to the user object's location in the existing session.

Figure 4:
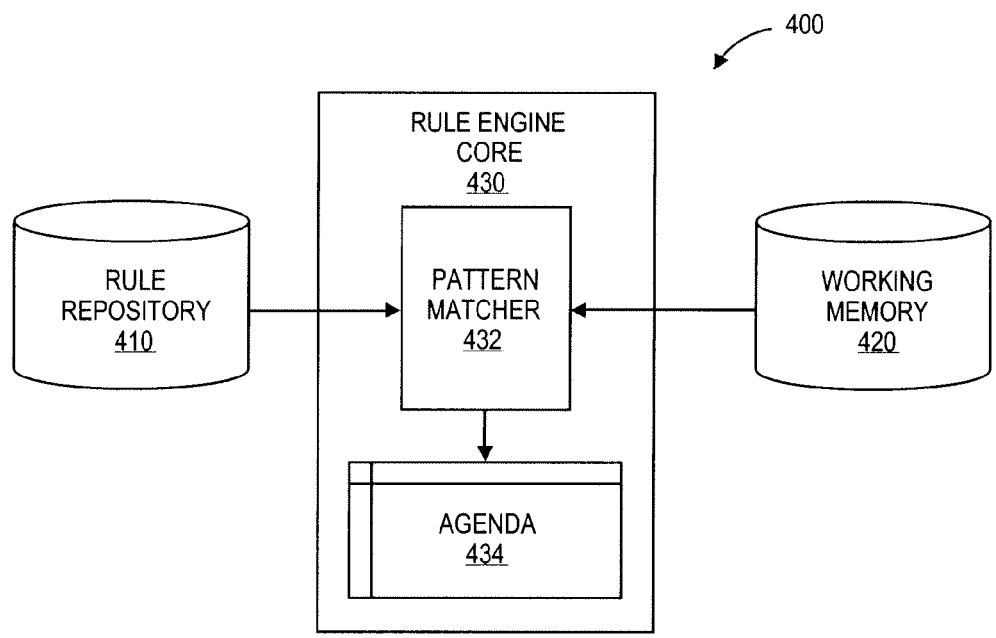
FIG. 4 shows one embodiment of a rule engine.

FIG. 4 shows the details of one embodiment of a rule engine. The rule engine 400 includes a rule engine core 430, a rule repository 410, and a working memory 420. In some embodiments, the rule engine core 430 is operatively coupled to the rule repository 410 and the working memory 420. The rule repository 410 stores a rule set having a number of rules. The rule repository 410 may also be referred to as a production memory. The working memory 420 stores data objects (also referred to as facts) that have been asserted. The data objects include one or more user objects. As discussed in details above, the user objects may be marshalled into or marshalled out of the rule engine 400 by executing one or more marshalling plug-ins available to the rule engine 400.

In some embodiments, the rule engine core 430 further includes a pattern matcher 432 and an agenda 434. The pattern matcher 432 implements a logical network (such as a Rete network) to evaluate the rules from the rule repository 410 against the user objects in the working memory 420. Fully matched rules result in activations, which are placed into the agenda 434 for execution. If a rule fails to be fully matched and thus, no corresponding activation results, then nothing happens.

Figure 5:
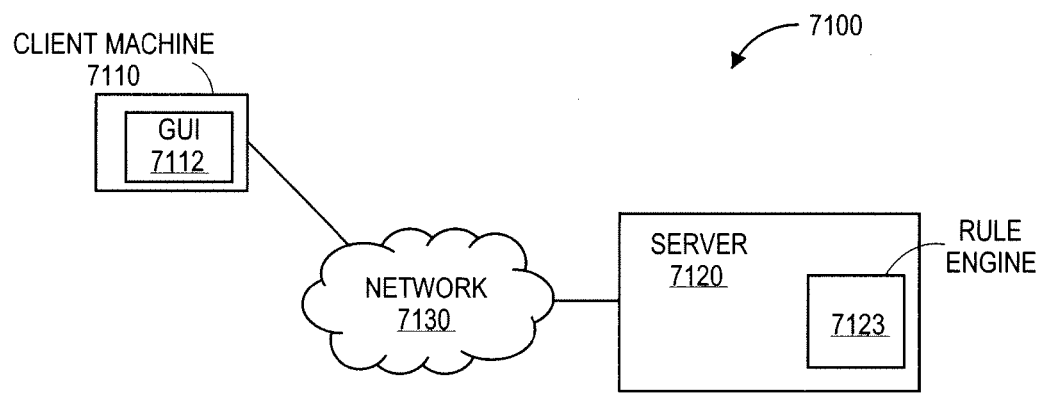
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having an architecture as illustrated in FIG. 4. The client machine 7110 may present a GUI 7112 (e.g., a web-page rendered by a browser) to allow users to input rule sets and/or data objects, which may be sent to the server 7120 to be processed using the rule engine 7123 as discussed above.

Figure 6:
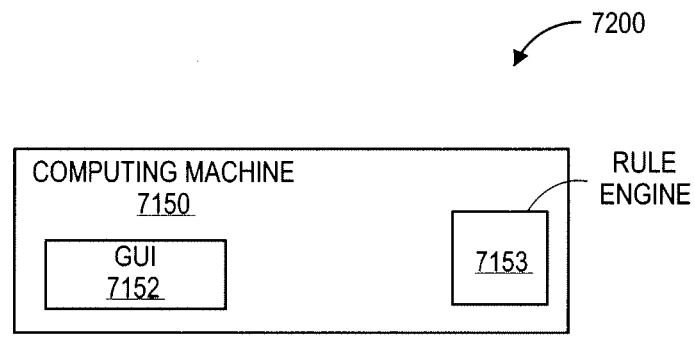
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. In some embodiments, users may input files for rules using the GUI 7152. Then the files may be processed by rule engine 7153 as discussed above.

Figure 7:
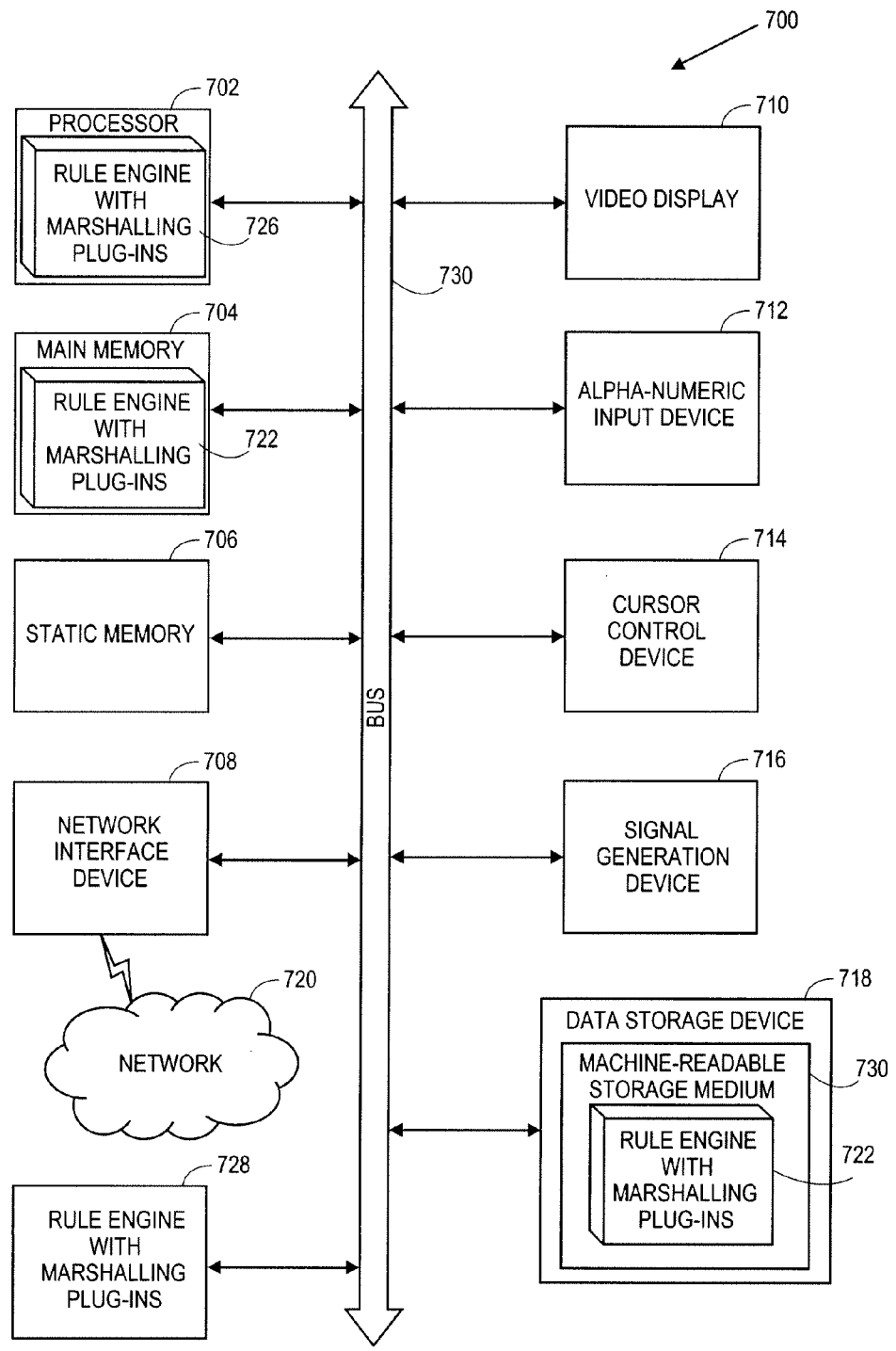
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 732.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the rule engine with marshalling plug-ins 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a machine-readable storage medium) on which is stored one or more sets of instructions (e.g., rule engine with marshalling plug-ins 722) embodying any one or more of the methodologies or functions described herein. The rule engine with marshalling plug-ins 722 may also reside, completely or at least partially, within the main memory 704 and/or within the processing device 702 during execution thereof by the computer system 700, the main memory 704 and the processing device 702 also constituting machine-accessible storage media. The rule engine with marshalling plug-ins 722 may further be transmitted or received over a network 720 via the network interface device 708.

While the machine-readable storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The module, rule engine with marshalling plug-ins 728, components and other features described herein (for example, in relation to FIG. 3) can be implemented as discrete hardware components or integrated into the functionalities of hardware components, such as ASICS, FPGAs, DSPs, or similar devices. In addition, the rule engine with marshalling plug-ins 728 can be implemented as firmware or functional circuitries within hardware devices. Further, the rule engine with marshalling plug-ins 728 can be implemented in any combination of hardware devices and software components.

Thus, some embodiments of efficient binary protocol marshalling for rule engine sessions have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
analyzing a session by a rules engine running on a processing device, wherein the rules engine is to implement a Rete network to evaluate rules against user objects;
identifying, by the processing device, a reference to a user object in the session based on the analysis; and
selecting, by the processing device, a marshalling plug-in based on a type of the user object to marshal out the user object.

2. The method of claim 1, wherein analyzing the session comprises:
parsing contents of the session; and
searching for references to user objects in the session using the parsed contents.

3. The method of claim 1, further comprising:
writing information of the session into an outgoing binary stream of data; and
executing the marshalling plug-in to insert into the outgoing binary stream a placeholder for the user object at a position in the outgoing binary stream corresponding to a location of the reference in the session.

4. The method of claim 1, wherein selecting the marshalling plug-in comprises:
searching in a map that relates user object types to identities of corresponding marshalling plug-ins for an entry associated with the user object type; and
identifying in the map the marshalling plug-in that is associated with the user object type.

5. The method of claim 1, wherein selecting the marshalling plug-in comprises:
searching in a map that relates user object types to identities of corresponding marshalling plug-ins for an entry associated with the user object type;
determining that no entries in the map are associated with the user object type; and
identifying a default marshalling plug-in, wherein the selected marshalling plug-in is the default marshalling plug-in.

6. The method of claim 1, wherein the marshalling plug-in implements a serialized marshalling strategy.

7. The method of claim 1, wherein the marshalling plug-in implements an identity marshalling strategy that preserves a state of the user object.

8. A non-transitory computer readable storage medium having instructions that, when executed by a processing device, cause the processing device to:
analyze a session by a rules engine running on the processing device, wherein the rules engine is to implement a Rete network to evaluate rules against user objects;
identify, by the processing device, a reference to a user object in the session based on the analysis; and
select, by the processing device, a marshalling plug-in based on of a type of the user object to marshal out the user object.

9. The non-transitory computer readable storage medium of claim 8, wherein analyzing the session comprises:
parsing contents of the session; and
searching for references to user objects in the session using the parsed contents.

10. The non-transitory computer readable storage medium of claim 8, wherein the processing device is further to:
write information of the session into an outgoing binary stream of data; and
execute the marshalling plug-in to insert into the outgoing binary stream a placeholder for the user object at a position in the outgoing binary stream corresponding to a location of the reference in the session.

11. The non-transitory computer readable storage medium of claim 8, wherein selecting the marshalling plug-in comprises:
searching in a map that relates user object types to identities of corresponding marshalling plug-ins for an entry associated with the user object type; and
identifying in the map the marshalling plug-in that is associated with the user object type.

12. The non-transitory computer readable storage medium of claim 8, wherein selecting the marshalling plug-in comprises:
searching in a map that relates user object types to identities of corresponding marshalling plug-ins for an entry associated with the user object type;
determining that no entries in the map are associated with the user object type; and
identifying a default marshalling plug-in, wherein the selected marshalling plug-in is the default marshalling plug-in.

13. The non-transitory computer readable storage medium of claim 8, wherein the marshalling plug-in implements a serialized marshalling strategy.

14. The non-transitory computer readable storage medium of claim 8, wherein the marshalling plug-in implements an identity marshalling strategy that preserves a state of the user object.

15. A computing device comprising:
a memory to store instructions for a rules engine that is to implement a Rete network to evaluate rules against user objects; and
a processing device coupled to the memory to execute the instructions, wherein the processing device is to:
analyze a session;
identify a reference to a user object in the session based on the analysis; and
select a marshalling plug-in based on a type of the user object to marshal out the user object.

16. The computing device of claim 15, wherein to analyze the session the processing device parses contents of the session and searches for references to user objects in the session using the parsed contents.

17. The computing device of claim 15, wherein the processing device is further to:
write information of the session into an outgoing binary stream of data; and
execute the marshalling plug-in to insert into the outgoing binary stream a placeholder for the user object at a position in the outgoing binary stream corresponding to a location of the reference in the session.

18. The computing device of claim 15, wherein to select the marshalling plug-in the processing device is to:
search in a map that relates user object types to identities of corresponding marshalling plug-ins for an entry associated with the user object type; and
identify in the map the marshalling plug-in that is associated with the user object type.

19. The computing device of claim 15, wherein to select the marshalling plug-in the processing device is to:
search in a map that relates user object types to identities of corresponding marshalling plug-ins for an entry associated with the user object type;

determine that no entries in the map are associated with the user object type; and identify a default marshalling plug-in, wherein the selected marshalling plug-in is the default marshalling plug-in.

20. The computing device of claim 15, wherein the marshalling plug-in implements at least one of a serialized marshalling strategy or an identity marshalling strategy that preserves a state of the user object.

21. A method comprising:

creating an empty session for a rule engine running on a processing device, wherein the rules engine is to implement a Rete network to evaluate rules against user objects;

reading in a binary stream of data by the processing device;

identifying in the binary stream of data a placeholder of a user object; and selecting, by the processing device, a marshalling plug-in in view of a type of the user object to marshal in the user object.

* * * * *